United States Patent
McVey

(10) Patent No.: US 7,402,788 B2
(45) Date of Patent: Jul. 22, 2008

(54) DETECTOR DIODES WITH BIAS CONTROL LOOP

(75) Inventor: James D. McVey, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/395,057

(22) Filed: Mar. 31, 2006

(65) Prior Publication Data

US 2006/0219872 A1 Oct. 5, 2006

Related U.S. Application Data

(60) Provisional application No. 60/666,904, filed on Mar. 31, 2005.

(51) Int. Cl.
*G01J 1/44* (2006.01)
*H01L 31/00* (2006.01)

(52) U.S. Cl. .................................. 250/214 R; 327/514

(58) Field of Classification Search ............. 250/214 R; 327/514

See application file for complete search history.

(56) References Cited

U.S. PATENT DOCUMENTS 5,548,112 A * 8/1996 Nakase et al. ........... 250/214 C
2003/0066947 A1* 4/2003 Alwan et al. ................ 250/206

* cited by examiner

*Primary Examiner*—Georgia Y. Epps
*Assistant Examiner*—Kevin Wyatt
(74) *Attorney, Agent, or Firm*—Workman Nydegger

(57) ABSTRACT

Methods and devices provide for a dynamic bias voltage control in detector photodiodes. The methods and systems use a bias control loop to make continuous detections of changes in the effective breakdown current of the detector photodiodes, thereby enabling the devices to change the bias voltage as needed. In one embodiment, a sense diode is added and operated at the breakdown current while the detector diode is operated at a small offset from the breakdown current. As performance conditions change, a feedback loop with the sense diode detects changes in the breakdown current and is used to adjust the bias voltage as necessary. In another embodiment, no sense diode is used. Rather, the detector diode itself is maintained at the breakdown current by a low frequency feedback loop. The optical signal is measured by a high frequency filter.

18 Claims, 4 Drawing Sheets ical data transmission systems. More particularly, the present invention relates to optoelectronic devices having a bias control loop to dynamically adjust the reverse bias applied to avalanche photodiodes during operation and thereby improve the operation of the avalanche photodiodes.

DETECTOR DIODES WITH BIAS CONTROL LOOP

CROSS-REFERENCE TO RELATED APPLICATIONS

This application claims the benefit of U.S. Provisional Application No. 60/666,904, filed Mar. 31, 2005, which is incorporated herein by reference in its entirety.

BACKGROUND OF THE INVENTION

1. The Field of the Invention

The present invention relates generally to the field of optical data transmission systems. More particularly, the present invention relates to optoelectronic devices having a bias control loop to dynamically adjust the reverse bias applied to avalanche photodiodes during operation and thereby improve the operation of the avalanche photodiodes.

2. The Relevant Technology

Computer and data communications networks continue to develop and expand due to declining costs, improved performance of computer and networking equipment, the remarkable growth of the internet, and the resulting increased demand for communication bandwidth. Such increased demand occurs within and between metropolitan areas as well as within communications networks. Moreover, as organizations have recognized the economic benefits of using communications networks, network applications such as electronic mail, voice and data transfer, host access, and shared and distributed databases are increasingly used as a means to increase user productivity.

This increased demand, together with the growing number of distributed computing resources, has resulted in a rapid expansion of the number of fiber optic systems required. Through fiber optics, digital data in the form of light signals is formed by light emitting diodes or lasers and then propagated through a fiber optic cable. Such light signals allow for high data transmission rates and high bandwidth capabilities.

In a typical fiber-optic network, the transmission and reception of data is not strictly limited to optical signals, however. Digital devices such as computers may communicate using both electronic and optical signals. As a result, optical signals need to be converted to electronic signals and electrical signals need to be converted to optical signals. To convert electronic signals to optical signals for transmission on an optical fiber, a transmitter having a light emitter such as a laser is used. A transmitter uses an electronic signal to drive the light emitter to generate an optical signal. When optical signals are converted to electronic signals, a receiver is used. The receiver has a photodiode that, in conjunction with other circuitry, detects optical signals and converts the optical signals to electronic signals. A transceiver is a common device that incorporates both a transmitter and a receiver.

One very sensitive type of photodiode is an avalanche photodiode. Avalanche photodiodes are well-known devices that serve at least two functions: 1) conversion of optical signals into electrical signals; and 2) amplification of the electrical signal through avalanche multiplication. Typically, an avalanche photodiode has an absorption layer where an optical signal is absorbed. Photons in the optical signal impinging the absorption layer generate an electron-hole pair or a carrier. A multiplication layer in the avalanche photodiode is designed such that one carrier causes an avalanche of other carriers where the number of other carriers is dependent on the gain of the avalanche photodiode.

The gain of an avalanche photodiode is facilitated by a pre-applied electrical voltage across the avalanche photodiode, the result of which is that a reduced amount of power from an optical signal is required to trigger the "breakdown," or the avalanche of carriers in the avalanche photodiode that results in the detection of an optical signal. This pre-applied electrical voltage is applied by a bias voltage in the circuitry driving the avalanche photodiode. It is preferable to raise the bias voltage to as near the breakdown level as possible without allowing the diode to go into breakdown. The amount the bias voltage is backed off from the breakdown level is sometimes referred to as the offset.

Though generally effective, present avalanche photodiodes suffer from various problems that reduce their longevity or increase their cost. For example, the correct bias voltage is a strong function of the temperature of the avalanche photodiode chip. Present avalanche photodiodes must therefore have their avalanche photodiode bias voltage calibrated over a range of temperature extremes to ensure proper operation. Still, thermal gradients within an optoelectronic device and component aging can render the calibration inaccurate.

In addition, some conventional avalanche photodiode systems have a problem in that the back off (or "offset") in bias voltage is quite large. This is necessary since the control of the voltage versus temperature is crude and since it is important that the voltage never exceed the breakdown level. The large offset causes lower performance in the receiver. This can result in lower yield, relaxed (less competitive) specifications, and/or can require higher performance (higher price) components to reach the desired specifications.

As previously noted, the correct bias voltage is a strong function of the temperature of the avalanche photodiode chip. Various conventional products use a temperature sensor and a look-up table to set the bias. The values in this table are determined at manufacture time by placing the module in a temperature chamber and adjusting the avalanche photodiode bias voltage at cold, room, and hot temperatures. The performance of the avalanche photodiode improves as the bias voltage increases until the voltage becomes too high and the diode breaks down. Therefore, in devices using a temperature look-up scheme the voltage can be typically adjusted within about 2 volts or less of breakdown. Other products which use simpler control mechanisms are often set more than 5 volts below breakdown.

The conventional scheme using a temperature look-up table is disadvantageous, however, in that the temperature sensor is not located at the avalanche photodiode chip so any temperature gradient creates an error in setting the bias voltage. If the gradient is large enough (for example 10° C. in some designs), the diode can be driven into breakdown despite the use of the temperature look-up table. In addition, setting the table requires significant test time during manufacturing due to the need to calibrate the module at different temperatures. Also, once the module is calibrated, there is no allowance for aging or drift in the values of the many components which make up the avalanche photodiode system.

BRIEF SUMMARY

The above-identified deficiencies of avalanche photodiode biasing methods are overcome through example embodiments disclosed herein. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for methods and systems for biasing a detector diode. The method generally includes using a feedback loop that senses the current output from a sense diode to maintain a bias voltage at the sense diode that is sufficient to bring the sense diode close to or into its breakdown state. Information from the feedback loop is then used to apply the bias voltage with some offset to a detector diode. Accordingly, the sense diode is at close to or into its breakdown state while the detector diode is not in the breakdown state due to the offset.

Another example embodiment provides for methods and systems for biasing a detector diode to increase optical sensitivity. This method generally involves measuring a current output from a detector diode using a current sensor. A feedback loop that is connected to the current sensor is used to maintain a bias voltage at the detector diode that is sufficient to bring the detector diode close to or into its breakdown state regardless of the optical power being received by the detector diode.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
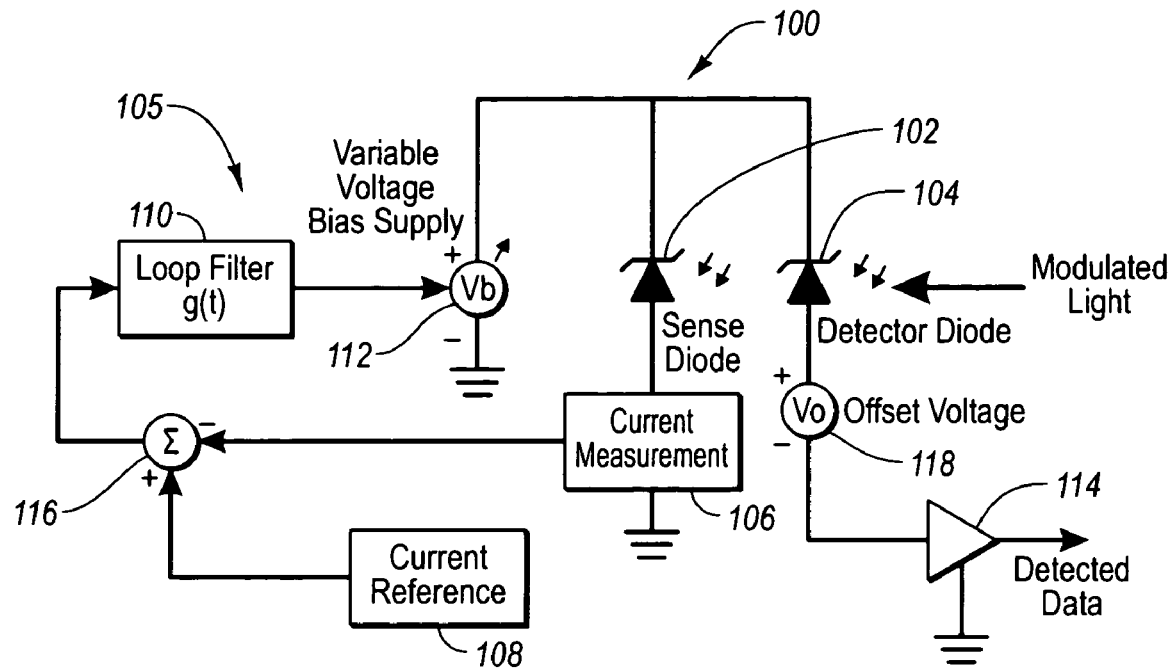
FIG. 1 schematically illustrates various components of an optoelectronic device having a detector diode with a bias control loop according to one embodiment disclosed herein.

The embodiments discloses herein provide systems and methods for the dynamic operation of detector diodes such as avalanche photodiodes at a desired breakdown current or offset voltage. Whereas conventional avalanche photodiodes experience a drift of the breakdown level as temperatures change or the device ages, the present systems and methods dynamically adjust the bias voltage by using feedback loops. Although conventional systems and methods have approaches for overcoming drift in breakdown levels, the present systems and methods are more accurate because they are based on real time measurements and account for multiple variables at once.

The novel biasing systems represent an advance in the art by, among other things: eliminating calibration of avalanche photodiode bias voltage over a range of temperature extremes; improving reliability of the module in field conditions by assuring that the correct bias voltage is always applied despite component aging, thermal gradients, and other variables; and improving product yield by maximizing avalanche photodiode performance since the bias "back-off" is reduced without allowing the diode to go into breakdown.

Accordingly, a first example embodiment is a method for biasing a detector diode to increase optical sensitivity. The method generally includes using a feedback loop that senses the current output from a sense diode to maintain a bias voltage at the sense diode that is sufficient to bring the sense diode close to or into its breakdown state. Information from the feedback loop is then used to apply the bias voltage with some offset to a detector diode. Accordingly, the sense diode is at close to or into its breakdown state while the detector diode is not in the breakdown state due to the offset.

Another example embodiment is another method for biasing a detector diode to increase optical sensitivity. This method generally involves measuring a current output from a detector diode using a current sensor. A feedback loop that is connected to the current sensor is used to maintain a bias voltage at the detector diode that is sufficient to bring the detector diode close to or into its breakdown state regardless of the optical power being received by the detector diode.

In the following description, numerous specific details are set forth in order to provide a thorough understanding of the present invention. It will be obvious, however, to one skilled in the art after having read this description that the embodiments disclosed herein may be practiced without these specific details. In other instances, well-known aspects of optical systems, optoelectronic devices, and avalanche photodiodes in particular have not been described in particular detail in order to avoid unnecessarily obscuring the present invention.

Reference will now be made to the drawings wherein like structures will be provided with like reference designations. It is understood that the drawings are diagrammatic and schematic representations of presently preferred embodiments of the invention, and are not limiting of the present invention nor are they necessarily drawn to scale.

Referring now to FIG. 1, an embodiment of a biasing system 100 uses two "matched" diodes, sense diode 102 and detector or receiver diode 104. The diodes are matched in that they are preferably, though not necessarily, identical devices in close proximity on a single die. As a result, aging and temperature fluctuations will affect them in the same manner so that variations at the sense diode can be correlated to variations in the detector diode. Of course, embodiments of the invention may include a sense diode and a detector diode that are not in close proximity or identical in structure, but adjustments and calibrations may need to be made to account for the differences.

The diodes 102, 104 (as well as diode 202 discussed below) are preferably avalanche photodiodes, but other detector diodes known in the art or developed hereafter that similarly rely on an applied bias voltage for operation are also included within the scope of the invention. Accordingly, where avalanche photodiodes are referred to herein, it will be understood that the discussion may also apply to other diodes.

As is well known in the art, bias voltage is applied to an avalanche photodiode to reduce the optical power necessary to initiate a signal avalanche and thus signal detection. As the bias voltage applied to an avalanche photodiode is increased, the sensitivity of the avalanche photodiode to a light stimulus is increased since less of a light stimulus is required to reach a characteristic avalanche voltage and thereby trigger the avalanche breakdown. The avalanche voltage is typically in a range between 40 volts and 70 volts at room temperature; however it varies from one device to another and also varies as a (generally increasing) function of the temperature of the avalanche photodiode. It also varies with device aging. The sensitivity of an avalanche photodiode is maximized when it is operated at a bias voltage that is less than the avalanche voltage by an offset voltage $V_O$ that is relatively small. Generally, the offset voltage is less than about 3 volts. However, offset voltages of less than about 1 volt are also common for some avalanche photodiodes. In FIG. 1, the bias voltage is preferably set to the avalanche voltage and denoted by $V_b$ and the offset voltage $V_O$ is used to provide the offset 118.

According to the embodiments disclosed herein, the sense diode 102 is used to predict the breakdown current of the detector diode 104. Thus, rather than relying upon a lookup table or some other pre-calibrated mechanism to make adjustments in the bias voltage, the present invention makes dynamic adjustments tailored to actual conditions. In FIG. 1, a feedback loop 105 is used to adjust the bias voltage on the sense diode 102 up and down to maintain a bias voltage that is sufficient to bring the sense diode close to or into its breakdown state. Note that in this description and in the claims, maintaining a bias voltage that is sufficient to bring the sense diode or detector diode close to or into a breakdown state includes adjusting or changing the bias voltage as necessary.

As temperatures rise and fall or the device ages, the feedback loop 105 constantly measures the actual current output of the sense diode 102. In preferred embodiments of the invention, no light shines on this sense diode 102 so all the measured current is breakdown current. In other embodiments, a small amount of light reaches sense diode 102 due to the proximity of the sense diode 102 to the detector diode 104, but is accounted for in the system through calibrations or look up tables.

In some embodiments, the feedback loop 105 includes a current measurement device 106, which can be any reasonable current measurement device, and a current reference value 108 which is stored in a memory by methods known in the art. The feedback loop 105 also includes a loop filter 110, which provides necessary filtering and other signal processing and can be any reasonable filter, a variable voltage bias supply 112, which may also be any reasonable variable voltage bias supply, and a comparator or summer 116. The current generated by the sense diode 102 is measured by the current measurement device 106 and then compared by summer 116 to the current reference value 108 to determine a current error value, which represents the difference in the measured and reference values. This current error value is processed by a loop filter 110, which in turn directs the variable voltage bias supply 112 to raise, lower, or maintain the bias voltage $V_b$. As previously noted, the bias voltage is set such that the sense diode 102 is constantly at close to or at breakdown to maintain a small but constant breakdown current.

The bias voltage that is applied to maintain sense diode 102 close to or at breakdown is also applied to detector diode 104. The detector diode is adjusted, however, to have an effective bias voltage that is smaller than the voltage on the sense diode 102. This is accomplished by the offset voltage Vo 118, which in one embodiment may be simply the input voltage of a gain stage that follows the detector diode 104, which is some embodiments may be a transimpedance amplifier 114. As mentioned previously, the offset voltage may be less than about 3 volts in some embodiments and may even be less than about 1 volt. Because the bias voltage on the detector diode 104 is dynamically maintained close to breakdown, but always below breakdown, the sensitivity and performance of detector diode 104 is increased. Thus, the detector diode 104 is highly sensitive to receiving and detecting an optical signal. Detector diode 104 will conduct current when an optical high is received and not conduct when an optical low is received. The detected data may then be provided to other circuitry of an optical transceiver.

In some embodiments, it may not be possible to keep an incoming modulated light signal off of the sense diode 102. This would be especially true if both sense diode 102 and detector diode 104 were fabricated on a single chip, which they preferably are. The single chip approach is desirable in terms of avalanche voltage matching, semiconductor die area, and part count. As previously noted, if some of the light from the incoming modulated signal falls on the sense diode 102, then a correction for the breakdown current may be required. One solution is to measure the photodiode current in the detector diode 104 and subtract a portion of that from the sense diode 102 current.

Figure 2:
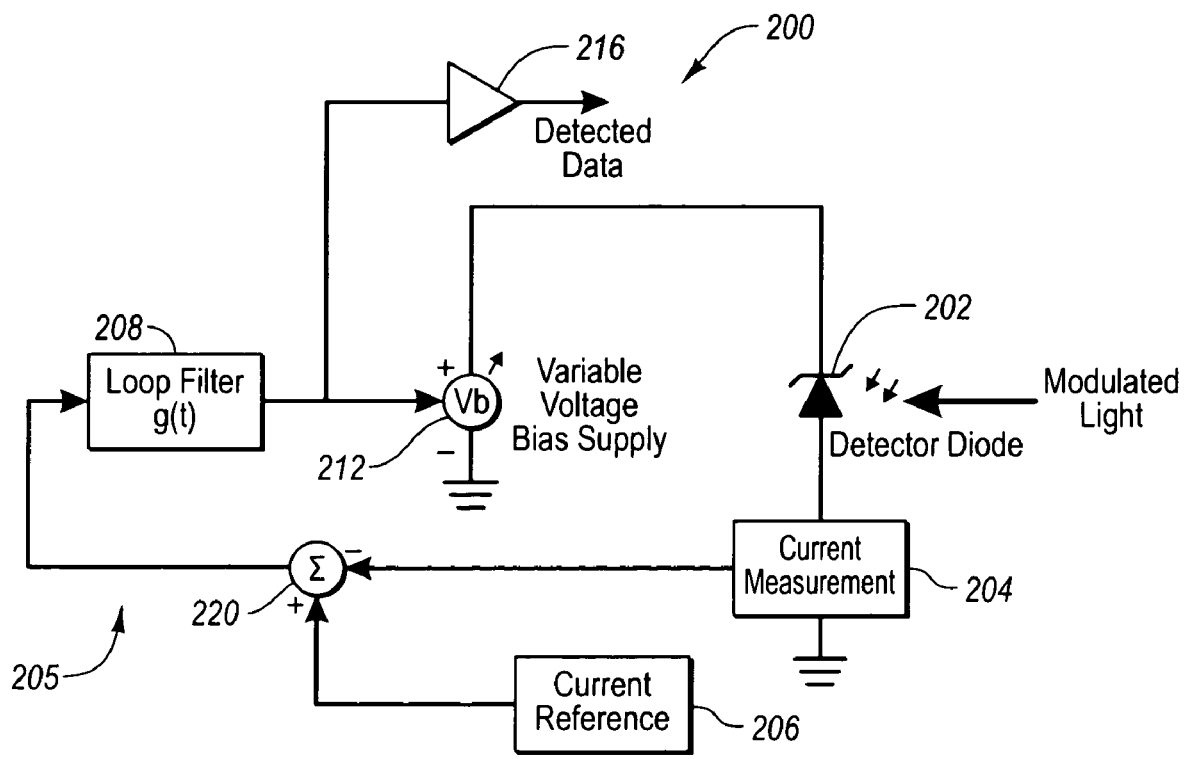
FIG. 2 schematically illustrates various components of an optoelectronic device having a detector diode with a bias control loop according to one embodiment disclosed herein.

Another embodiment of a biasing system 200 is shown in FIG. 2. This embodiment is a single diode breakdown detection demodulator. This embodiment uses only a single diode, detector diode 202, which is kept constantly close to or in a breakdown state. A feedback loop 205 rapidly controls the bias voltage to keep the detector diode 202 output current as near constant as possible, thus the variable bias voltage becomes a measure of the external stimulus. In the case of the avalanche photodiode, the external stimulus is light shining on the detector diode 202. When light shines on the detector diode 202, current flows. Specifically, the light may be considered as a series of digital ones and zeros. Power incident on detector diode 202 from the reception of a digital one causes the current to flow. When no light shines on the detector diode 202, the bias voltage must be raised to cause detector diode 202 to enter breakdown in order for current to flow. Accordingly, when feedback loop 205 adjusts the bias voltage to maintain detector diode 202 close to or at breakdown, a signal is produced (the fluctuating bias voltage) which detects the incoming modulated light signal.

In operation, a current measurement from the detector diode 202 is measured by a current measurement device or sensor 204 and compared by a comparator or summer 220 to a current reference value 206 that is stored in a memory by known means. This comparison ensures that the detector diode 202 is, in fact, operating close to or in breakdown. As with FIG. 1 above, the current sensor 204 may be any reasonable current sensor. The difference, or current error value, between the detected current and the reference current is then fed to a loop filter 208 so that any necessary voltage adjustments can be made from the variable voltage bias supply 212.

For example, when an optical high or digital one is incident on detector diode 202, less bias voltage is needed to maintain the detector diode close to or at breakdown. Conversely, when an optical low or digital zero is incident of the detector diode 202, more bias current is needed to maintain the detector diode close to or at breakdown. Accordingly, loop filter 208 directs variable voltage bias supply 212 to lower the bias voltage when current caused by a digital one is measured and to raise the bias voltage when current caused by a digital zero is measured. This change in bias current may typically be on the order of a few millivolts.

As mentioned above, this fluctuation in bias voltage used to keep detector diode close to or into breakdown regardless of the optical power being received may be used to detect an incoming modulated optical signal. An amplifier or other component 216 detects when loop filter directs the bias supply 212 to change bias voltage. Lowering the bias voltage may be interpreted as a digital one and raising the bias voltage may be interpreted as a digital zero. The detected data may then be provided to other circuitry of an optical transceiver.

Figure 3:
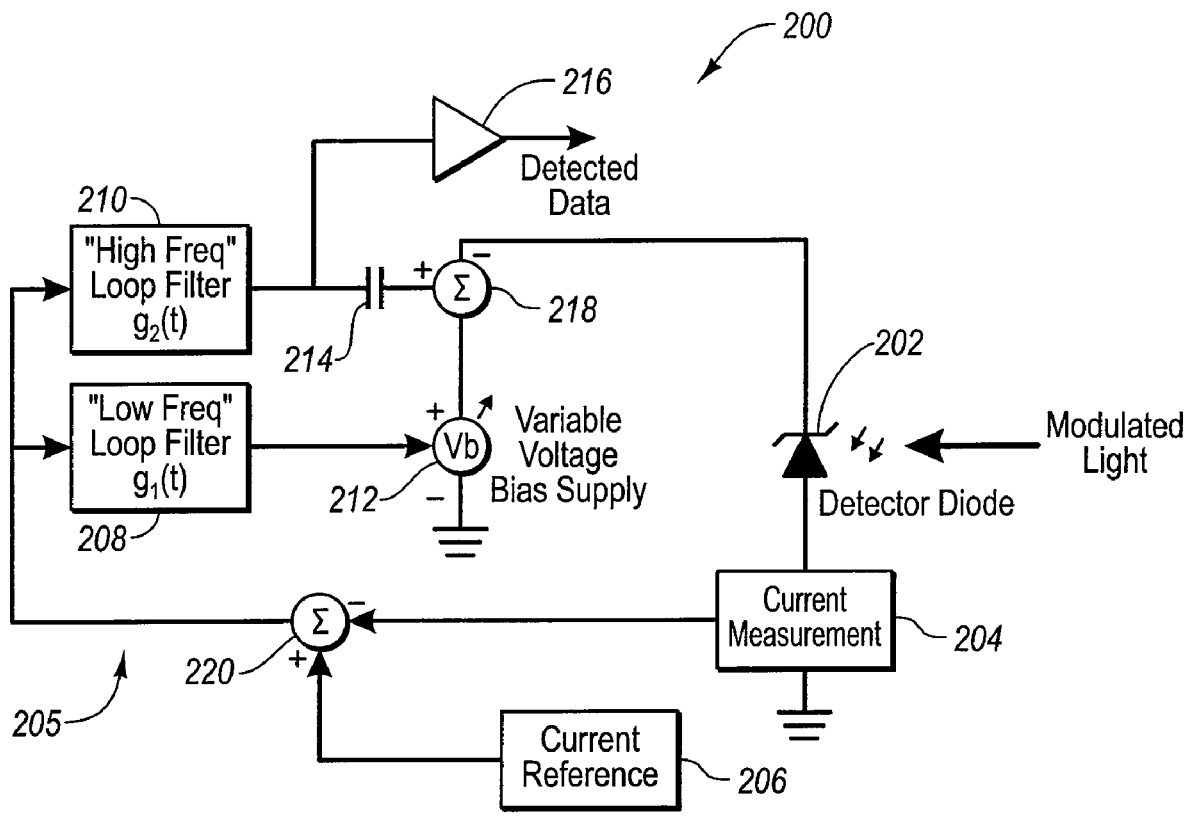
FIG. 3 schematically illustrates another embodiment of the optical device illustrated in FIG. 2.

In some embodiments the feedback loop 205 consists of two parts, as is illustrated in FIG. 3. A low frequency voltage section having a low frequency loop filter 208, which may be any reasonable low frequency loop filter, adjusts to track and respond to changes in detector diode 202 current output caused by temperature, component aging, etc. A high frequency voltage section having a high frequency loop filter 210, which may be any reasonable high frequency loop filter, detects the modulated data on the incoming light. Note that FIG. 3 also includes various other components previously discussed in FIG. 2. Also note that in some embodiments, detector diode 202, low frequency loop filter 208, and high frequency loop filter 210 may be integrated on a single semiconductor die.

More particularly, low frequency loop filter 208 operates by conceptually ignoring any incoming digital ones and zeros (by viewing the data in large chunks that include many ones and zeros) and detecting overall shifts in the measured current error value. The low frequency loop filter 208 thereby ignores the optical signal to focus on maintaining the voltage bias at a desired level to maintain the detector diode 202 close to or at breakdown regardless of the optical power being received.

The current error value between the detected current 204 and the reference current 206 is also fed to the high frequency loop filter 210 so that optical signals can be detected and output as detected data by amplifier 216. In other words, the high frequency loop filter 210 focuses on the digital ones and zeros. Note that in some embodiments a coupling capacitor 214 is used to couple high frequency loop filter 210 to detector diode 202.

For example, when a the current caused by a digital one is measured, the error value will indicate that a lower bias current is needed to maintain detector diode 202 close to or at breakdown as the power incident on the detector diode from the digital one causes current to flow. High frequency loop filter will specify that a summer 218 apply a variable voltage that lowers the bias voltage being applied bias supply 212. This value is typically a few millivolts. In similar manner, when a the current caused by a digital zero is measured, the error value will indicate that a higher bias current is needed to maintain detector diode 202 close to or at breakdown. High frequency loop filter will specify that summer 218 apply a variable voltage that raises the bias voltage being applied bias supply 212. This value also is typically a few millivolts. In this way, amplifier 216 is able to detect the incident digital ones and zeros as previously described.

Figure 4:
FIG. 4 illustrates a method for biasing a detector diode according to one embodiment disclosed herein.

Referring now to FIG. 4, a flow chart of a method 400 for biasing a detector diode is illustrated. Note that although method 400 will be described with frequent reference to the system of FIG. 1, this is by way of example only. It will be appreciated after reading this description that method 400 may also be practiced in other process flows and environments. Also note that although FIG. 4 illustrates the various acts of method 400 in a sequential order, this is for ease of illustration and explanation only and is not meant to imply or disclose that the various acts of method 400 must occur in the illustrated sequential order. Accordingly, the embodiments disclosed herein anticipate the acts of method 400 occurring in various sequences as circumstances may warrant. For example, it is anticipated that certain acts may occur before, after, or in parallel with other acts of the method.

Method 400 includes an act of using a feedback loop that senses the current output from a sense diode, maintaining a bias voltage at the sense diode that is sufficient to bring the sense diode close to or into its breakdown state (act 402). For example, feedback loop 105 may sense the current output of sense diode 102. A bias voltage $V_b$ provided by variable voltage supply 112 is maintained at sense diode 102 to ensure that the sense diode is close to or at its breakdown state. In other words, a sufficient bias voltage $V_b$ is maintained to bring the sense diode 102 to a state just prior to entering breakdown or to place the sense diode 102 in breakdown. In some embodiments, sense diode 102 may be an avalanche photodiode.

Method 400 also includes an act of using information from the feedback loop to apply the bias voltage with some offset to a detector diode, whereby the sense diode is at close to or into its breakdown state and wherein the detector diode is not in the breakdown state (act 404). For example, information such as the bias voltage $V_b$ needed to place sense diode 102 close to or into breakdown is used by feedback loop 105 to apply the same bias voltage $V_b$ from bias source 112 to detector diode 104. In addition, some offset voltage 118, which in some embodiments supplies the gain stage of a transimpedance amplifier 114, is used to back off the detector diode 104 from breakdown such that detector diode 104 is not in the breakdown state. In some embodiments, the offset voltage is less than about 3 volts and may even be less than about 1 volt in some circumstances. Detector diode 104 may be an avalanche photodiode and may be a matched with sense diode 102 on the same die in close proximity. Biasing detector diode 104 in this manner allows the detector diode to be highly sensitive to receiving and detecting an optical signal.

As mentioned previously, the required bias voltage to properly bias detector diode 104 and sense diode 102 varies with such things as temperature and aging. Accordingly, method 400 may be repeated as needed to account for changing circumstances to ensure that detector diode 104 is always properly biased to the extent possible.

Figure 5:
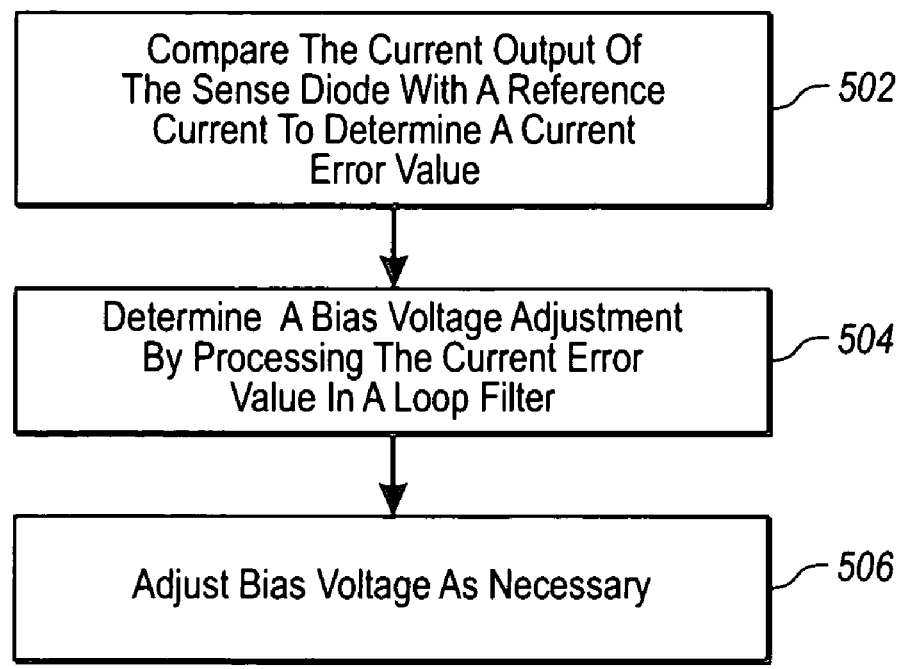
FIG. 5 illustrates a method for maintaining a bias voltage at the sense diode that is sufficient to bring the sense diode close to or into its breakdown state according to one embodiment disclosed herein.

Referring to FIG. 5, a method 500 for maintaining a bias voltage at the sense diode that is sufficient to bring the sense diode close to or into its breakdown state is illustrated. For example, method 500 includes an act of comparing the current output of the sense diode with a reference current to determine a current error value (act 502). For example, current measurement device 106 measures the output current of sense diode 102 to ascertain if the sense diode is still close to or at breakdown. The measured current is then compared with a known current reference 108. Any difference in these values is determined to be the current error value.

Method 500 also includes an act of determining a bias voltage adjustment by processing the current error value in a loop filter of the feedback loop (act 504). For example, loop filter 110 may process the current error value determined in act 406. The loop filter 110 may then determine a bias voltage adjustment that will adjust the bias voltage $V_b$ of sense diode 102 such that the sense diode is once again close to or at breakdown.

Method 500 further includes an act of adjusting the bias voltage as necessary (act 506). For example, the loop filter 110 may specify that variable voltage bias supply 112 adjust the level of bias voltage $V_b$ being applied to sense diode 102.

Figure 6:
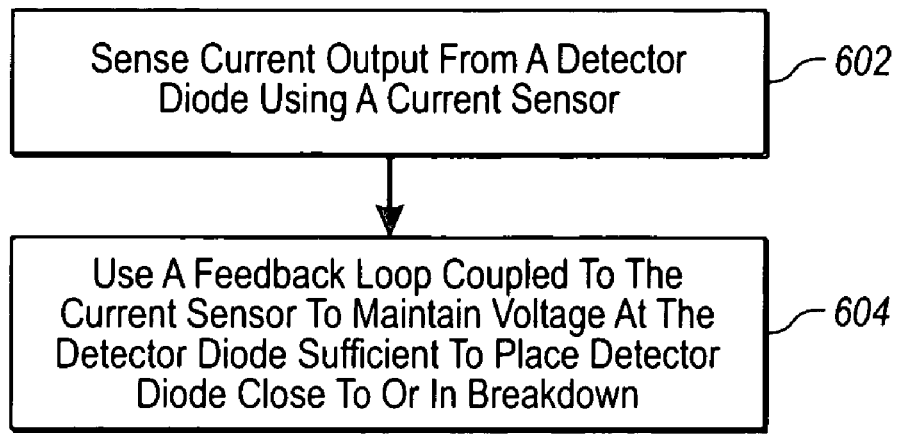
FIG. 6 illustrates a method for biasing a detector diode according to one embodiment disclosed herein.

Referring now to FIG. 6, a flow chart of a method 600 for biasing a detector diode is illustrated. Note that although method 600 will be described with frequent reference to the system of FIGS. 2 and 3, this is by way of example only. It will be appreciated after reading this description that method 600 may also be practiced in other process flows and environments. Also note that although FIG. 6 illustrates the various acts of method 600 in a sequential order, this is for ease of illustration and explanation only and is not meant to imply or disclose that the various acts of method 600 must occur in the illustrated sequential order. Accordingly, the embodiments disclosed herein anticipate the acts of method 600 occurring in various sequences as circumstances may warrant. For example, it is anticipated that certain acts may occur before, after, or in parallel with other acts of the method.

Method 600 includes an act of sensing a current output from a detector diode using a current sensor (act 602). For example, the current output of detector diode 202 is measured using a current measurement device or sensor 204.

Method 600 also includes an act of using a feedback loop coupled to the sensor to maintain a bias voltage at the detector diode that is sufficient to bring the detector diode close to or into its breakdown state regardless of the optical power level being received by the detector diode (act 604). For example, feedback loop 205 may be used to maintain a bias voltage applied to detector diode 202 to bring the detector diode 202 just prior to entering a breakdown state or to enter the breakdown state. This is true regardless of the optical power level being received. Accordingly, when an optical high is received, the bias current is lowered by the feedback loop and when an optical low is received, the bias voltage is raised. In this way, detector diode 202, which may beta photodiode in some embodiments, is maintained close to or at breakdown. The changes in the bias voltage levels may be used to detect the data modulated in the optical signal as has been described.

Figure 7:
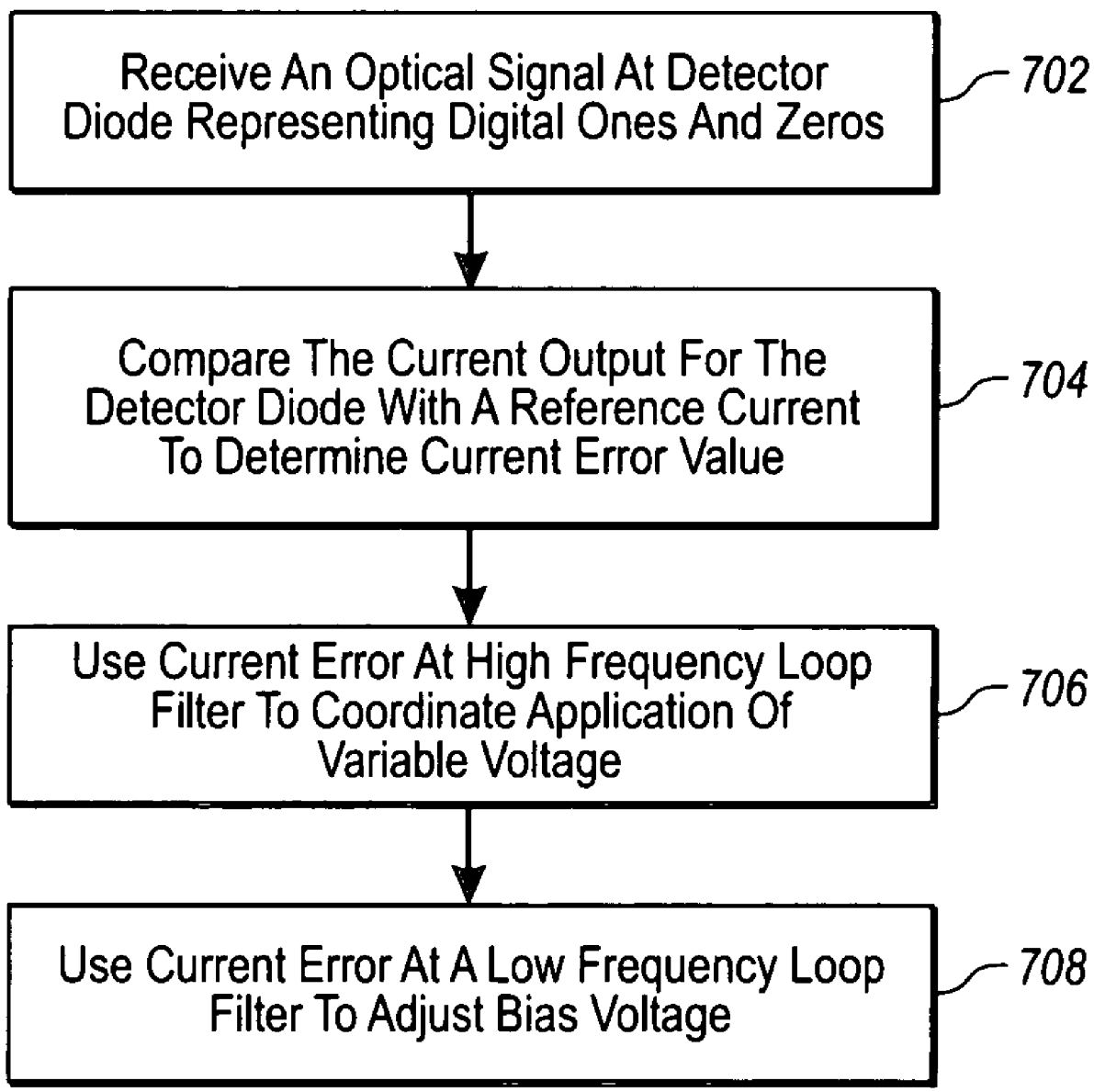
FIG. 7 illustrates a method for a feedback loop coupled to the current sensor to maintain a bias voltage at the detector diode.

Referring now to FIG. 7, a method 700 for a feedback loop coupled to the current sensor to maintain a bias voltage at the detector diode is illustrated. Note that although FIG. 7 illustrates the various acts of method 700 in a sequential order, this is for ease of illustration and explanation only and is not meant to imply or disclose that the various acts of method 700 must occur in the illustrated sequential order. Accordingly, the embodiments disclosed herein anticipate the acts of method 700 occurring in various sequences as circumstances may warrant. For example, it is anticipated that certain acts may occur before, after, or in parallel with other acts of the method.

Method 700 includes an act of receiving an optical signal at the detector diode, the optical signal representing a series of digital ones and zeros, wherein power incident upon the detector diode from the reception of a first digital value causes a current to flow in the detector diode that exceeds any current that might flow in the detector diode as a result of reception of a second digital value (act 702). For example, the optical signal received by detector diode 202 may represent a series of digital ones and zeros. Receiving a digital one causes current to flow in the detector diode, while receiving a digital zero does not cause current to flow.

Method 700 also includes an act of comparing the current output for the detector diode to a reference current to determine a current error (act 704). For example, the current output of detector diode 202 may be measured by current measurement device or sensor 204 as previously explained. This value is then compared to a current reference 206, the difference being the current error value.

Method 700 further includes using the current error at a high frequency loop filter of the feed back loop to coordinate the application of a variable voltage to the detector diode to maintain the detector diode at breakdown (act 706). For example, high frequency loop filter 210 may direct summer 218 to raise or lower the bias voltage being applied by variable voltage bias supply 212. As previously described, the high frequency filter 210 uses the current error to ascertain whether a digital one or zero is incident on detector diode 202. If a digital one is incident, then less bias voltage is needed to maintain the detector diode 202 close to or in breakdown. Conversely, if a digital zero is incident, then a higher bias voltage is necessary to maintain the detector diode 202 close to or in breakdown.

Method 700 also includes an act of using the current error at a low frequency loop filter of the feedback loop to adjust the bias voltage (act 708). For example, low frequency loop filter 208 uses the error value to specify to variable voltage bias supply to adjust the bias voltage applied to detector diode 202. As mentioned previously, low frequency loop filter 208 ignores the effects of the digital ones and zeros on the output current and detects overall shifts in the measured current error value caused by changes in temperature, aging, and the like.

In some implementations of the embodiments disclosed herein, the detector diodes and control circuitry described hereinabove are housed within a transceiver module used to transmit and receive optical or light signals. The transceiver module includes various electronics that create modulated signals representative of data to be transmitted using an optical fiber as well as additional components and circuits of the transceiver that convert the modulated signals into optical or light signals that are propagated along an optical fiber. Details regarding transceiver modules using avalanche photodiodes in the receiver are well known in the art. Much of the circuitry described herein can be housed within a receiver optical sub-assembly housing a detector photodiode, in other areas of the transceiver module, such as a printed circuit board in communication with the receiver, or in another electronic system that is communication with a transceiver module housing the present devices.

This bias control loop circuits are advantageous in part in that they eliminate temperature calibration, thereby reducing costs. Similarly, the elimination of the need to burn in avalanche photodiodes also reduces costs. The bias control loop circuits also lead to an increased yield since the best performance can be obtained for each assembly. Most importantly perhaps, the avalanche photodiodes have a stable performance over time (aging) and under real world (for example temperature gradient) conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for biasing a detector diode, comprising:
using a feedback loop that senses the current output from a sense diode,
maintaining a bias voltage at the sense diode that is sufficient to bring the sense diode close to or into its breakdown state; and
using information from the feedback loop to apply the bias voltage with some offset to a detector diode, whereby the sense diode is at close to or into its breakdown state and wherein the detector diode is not in the breakdown state due to the offset;
wherein maintaining a bias voltage at the sense diode that is sufficient to bring the sense diode close to or into its breakdown state comprises:
comparing the current output of the sense diode with a reference current to determine a current error value;
determining a bias voltage adjustment by processing the current error value in a loop filter of the feedback loop; and
adjusting the bias voltage as necessary.

2. A method as defined in claim 1 further comprising:
receiving and detecting a modulated optical signal at the detector diode.

3. A method as defined in claim 1 wherein the offset voltage is less than about 3 volts.

4. A method as defined in claim 1 wherein the offset voltage is less than about 1 volt.

5. A method as defined in claim 1 wherein the detector diode and the sense diode are avalanche photodiodes.

6. A method as defined in claim 1 wherein the sense diode and the detector diode are matched diodes located in close proximity on the same die.

7. A method as defined in claim 1, wherein the offset voltage is less than about 3 volts.

8. A method as defined in claim 1, wherein the offset voltage is less than about 1 volt.

9. A method as defined in claim 1, wherein the detector diode and the sense diode are avalanche photodiodes.

10. A method as defined in claim 1, wherein the offset voltage is supplied by the input stage of a transimpedance amplifier.

11. A method as defined in claim 1, wherein the sense diode and the detector diode are matched diodes located in close proximity on the same die.

12. A method for biasing a detector diode, comprising:
using a feedback loop that senses the current output from a sense diode,
maintaining a bias voltage at the sense diode that is sufficient to bring the sense diode close to or into its breakdown state; and
using information from the feedback loop to apply the bias voltage with some offset to a detector diode, whereby the sense diode is at close to or into its breakdown state and wherein the detector diode is not in the breakdown state due to the offset;
wherein the offset voltage is supplied by the input stage of a transimpedance amplifier.

13. An optoelectronic device comprising:
a sense diode;
a detector diode for receiving an optical signal;
a variable voltage bias supply in communication with, and configured for supplying a bias voltage to, the detector diode and the sense diode;
a feedback loop in communication with the sense diode for detecting shifts in the measured current of the sense diode and adjusting the bias voltage as necessary to maintain the sense diode close to or in a breakdown state; and
an offset voltage in communication with the detector diode for offsetting the bias voltage applied to the detector diode such that the detector diode is not in a breakdown state due to the offset voltage
wherein the feedback loop includes a current measurement device, a summer, and a loop filter.

14. An optoelectronic device as defined in claim 13 wherein the feedback loop uses the difference between a measured current output and a reference current to determine the shifts in the measured current of the sense diode.

15. An optoelectronic device as defined in claim 13 wherein the sense diode and the detector diode are avalanche photodiodes.

16. An optoelectronic device, comprising:
a sense diode;
a detector diode for receiving an optical signal;
a variable voltage bias supply in communication with, and configured for supplying a bias voltage to, an anode of the detector diode and an anode of the sense diode;
a current measurement device in communication with the cathode of the sense diode and with a summer;
a loop filter in communication with the summer and with the variable voltage bias supply, the current measurement device, summer and loop filter comprising a feedback loop for detecting shifts in the measured current of the sense diode and adjusting the bias voltage as necessary to maintain the sense diode close to or in a breakdown state; and
an offset voltage in communication with the detector diode for offsetting the bias voltage applied to the detector diode such that the detector diode is not in a breakdown state due to the offset voltage.

17. An optoelectronic device as defined in claim 16, wherein the feedback loop uses the difference between a measured current output and a reference current to determine the shifts in the measured current of the sense diode.

18. An optoelectronic device as defined in claim 16, wherein the sense diode and the detector diode are avalanche photodiodes.

* * * * *

UNITED STATES PATENT AND TRADEMARK OFFICE
CERTIFICATE OF CORRECTION

PATENT NO. : 7,402,788 B2  Page 1 of 1
APPLICATION NO. : 11/395057
DATED : July 22, 2008
INVENTOR(S) : McVey It is certified that error appears in the above-identified patent and that said Letters Patent is hereby corrected as shown below:

Column 4
Line 1, change "discloses" to --disclosed--

Column 7
Lines 53 and 60, change "a the" to --a--
Lines 57 and 63, change "filter" to --filter 210--
Lines 58 and 64, change "bias" to --to bias--

Column 8
Line 44, remove "a"

Column 9
Line 2, change "406" to --502--
Line 41, change "beta" to --be --

Column 10
Line 48, change "is" to --is in--
Line 49, change "this" to --these--

Signed and Sealed this

Fourteenth Day of September, 2010

David J. Kappos
*Director of the United States Patent and Trademark Office*